US007100854B2

(12) United States Patent
Aby-Eva et al.

(10) Patent No.: US 7,100,854 B2
(45) Date of Patent: Sep. 5, 2006

(54) CHOPPER

(75) Inventors: Grégoire Aby-Eva, Pittsburgh, PA (US); Dean DiPietro, Brooklyn, NY (US)

(73) Assignee: Helen of Troy Limited, St. Michael (BB)

(*) Notice: Subject to any disclaimer, the term of this patent is extended or adjusted under 35 U.S.C. 154(b) by 180 days.

(21) Appl. No.: 10/803,583

(22) Filed: Mar. 18, 2004

(65) Prior Publication Data

US 2005/0205705 A1 Sep. 22, 2005

(51) Int. Cl.
*A47J 43/04* (2006.01)

(52) U.S. Cl. ....................................... 241/169; 241/272

(58) Field of Classification Search ................ 241/168, 241/169, 169.1, 283, 272, 166
See application file for complete search history.

(56) References Cited

U.S. PATENT DOCUMENTS 2,140,010 A 12/1938 Hanel
2,787,308 A 4/1957 Popeil
2,895,520 A 7/1959 Morris
3,029,851 A 4/1962 Zysset
3,032,087 A 5/1962 Rodwick
3,083,747 A 4/1963 Zysset
3,933,315 A 1/1976 Popeil
3,988,114 A 10/1976 Gorin et al.
4,134,205 A 1/1979 Heling
4,192,470 A 3/1980 Hartmann
4,387,860 A 6/1983 Necas et al.
4,688,478 A 8/1987 Williams
4,752,041 A 6/1988 Franke et al.
4,756,323 A 7/1988 Horton
4,771,954 A 9/1988 Poncy
4,809,916 A 3/1989 Schwelling
4,921,175 A 5/1990 Okada et al.
4,967,970 A 11/1990 Michel
5,383,613 A 1/1995 Sundquist
5,408,922 A 4/1995 Gupta
5,653,092 A 8/1997 Gorby et al.
5,865,384 A * 2/1999 Pai .............................. 241/93
6,011,249 A 1/2000 Chung
6,042,034 A 3/2000 Abledu
6,142,399 A 11/2000 Huang
D464,853 S 10/2002 Klamer
6,467,711 B1 10/2002 Michel
6,558,348 B1 5/2003 Parsons
6,585,179 B1 7/2003 Weibel et al.
6,586,179 B1 7/2003 Jegla et al.
6,609,821 B1 8/2003 Wulf et al.
6,793,168 B1 * 9/2004 Pedersen ................. 241/169.1

(Continued)

FOREIGN PATENT DOCUMENTS

GB 821493 10/1959

(Continued)

*Primary Examiner*—Faye Francis
(74) *Attorney, Agent, or Firm*—Seyfarth Shaw LLP

(57) ABSTRACT

A food chopper includes a housing for receiving a food item, a blade assembly including a blade movable within the housing for chopping the food item, a shaft attached to the blade assembly for movement therewith, a plunger assembly coupled to the shaft for effecting, reciprocating, and rotational movement thereof, and a shock absorber disposed between the plunger assembly and the shaft. The shaft is threadedly connected to the blade assembly. The chopper may include a stripper fixed to the housing and responsive to movement of the blade assembly for removing food from the blade, and first and second guide structures respectively on the blade assembly and the stripper for guiding coupling of a blade assembly to the stripper.

8 Claims, 7 Drawing Sheets

U.S. PATENT DOCUMENTS

| | | | | |
|---|---|---|---|---|
| 6,929,201 | B1 * | 8/2005 | Blouse et al. | 241/169.1 |
| 6,966,510 | B1 * | 11/2005 | Pai | 241/169.1 |
| 2001/0024400 | A1 | 9/2001 | Van Der Wel | |
| 2001/0028007 | A1 | 10/2001 | Michel | |
| 2003/0213373 | A1 | 11/2003 | Dickson, Jr. | |
| 2005/0205704 | A1 * | 9/2005 | Yurchenco et al. | 241/169 |

FOREIGN PATENT DOCUMENTS

| | | |
|---|---|---|
| GB | 2287174 | 9/1995 |
| GB | 2293753 | 4/1996 |

* cited by examiner

CHOPPER

BACKGROUND

This application relates to systems for chopping or comminuting food stuff and, in particular, to hand-operated choppers of the reciprocating types.

Various types of reciprocating food choppers have heretofore been provided. They typically include some type of housing which, either alone or in combination with some underlying support surface, confine food item to be chopped by means of a vertically reciprocating chopping blade which is moved within the housing by a vertically reciprocating plunger/handle assembly, which may be spring-loaded to a raised position. The plunger assembly may be provided with an indexing mechanism which rotates the blade assembly slightly during each up/down cycle of the plunger assembly. Such choppers may be subjected to rather severe shocks and vibrations, particularly when chopping relatively hard food stuffs, such as nuts or the like. The repeated shocks of the engagement of the blade assembly with the food stuff and/or with the underlying support surface can cause damage to the structure of the chopper and may also be painful or uncomfortable for a user.

The prior choppers are often of relatively complex and expensive construction and may be difficult to assemble.

SUMMARY

There is disclosed herein an improved chopper which avoids disadvantages of prior choppers while affording additional structural and operating advantages.

In an embodiment, there is provided a food chopper comprising a housing for receiving a food item, a blade assembly including a blade and moveable within the housing for chopping the food item, a shaft attached to the blade assembly for movement therewith, a plunger assembly coupled to the shaft for effecting reciprocating and rotational movement thereof, and a shock absorber disposed between the plunger assembly and the shaft.

In an embodiment, the shaft may be threadedly connected to the blade assembly.

Also, in an embodiment, the chopper may include a stripper fixed to the housing and responsive to movement of the blade assembly for removing food from the blade, and first and second guide structures respectively on the blade assembly and the stripper for guiding coupling of the blade assembly to the stripper.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 6:
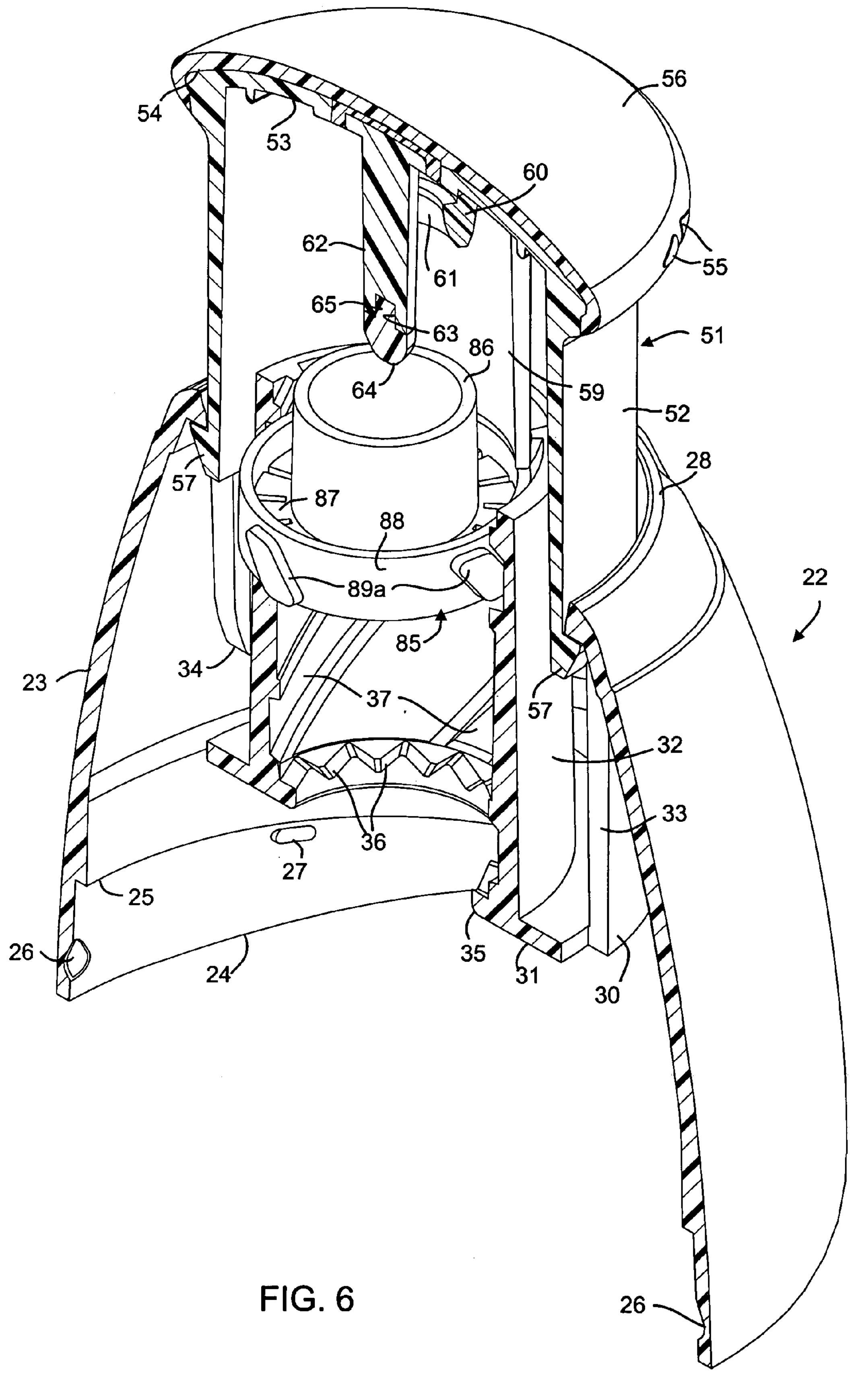
FIG. 6 is an enlarged, fragmentary, perspective view in vertical section of the upper body of the housing and portions of the plunger assembly of the chopper of FIG. 1.
Figure 7:
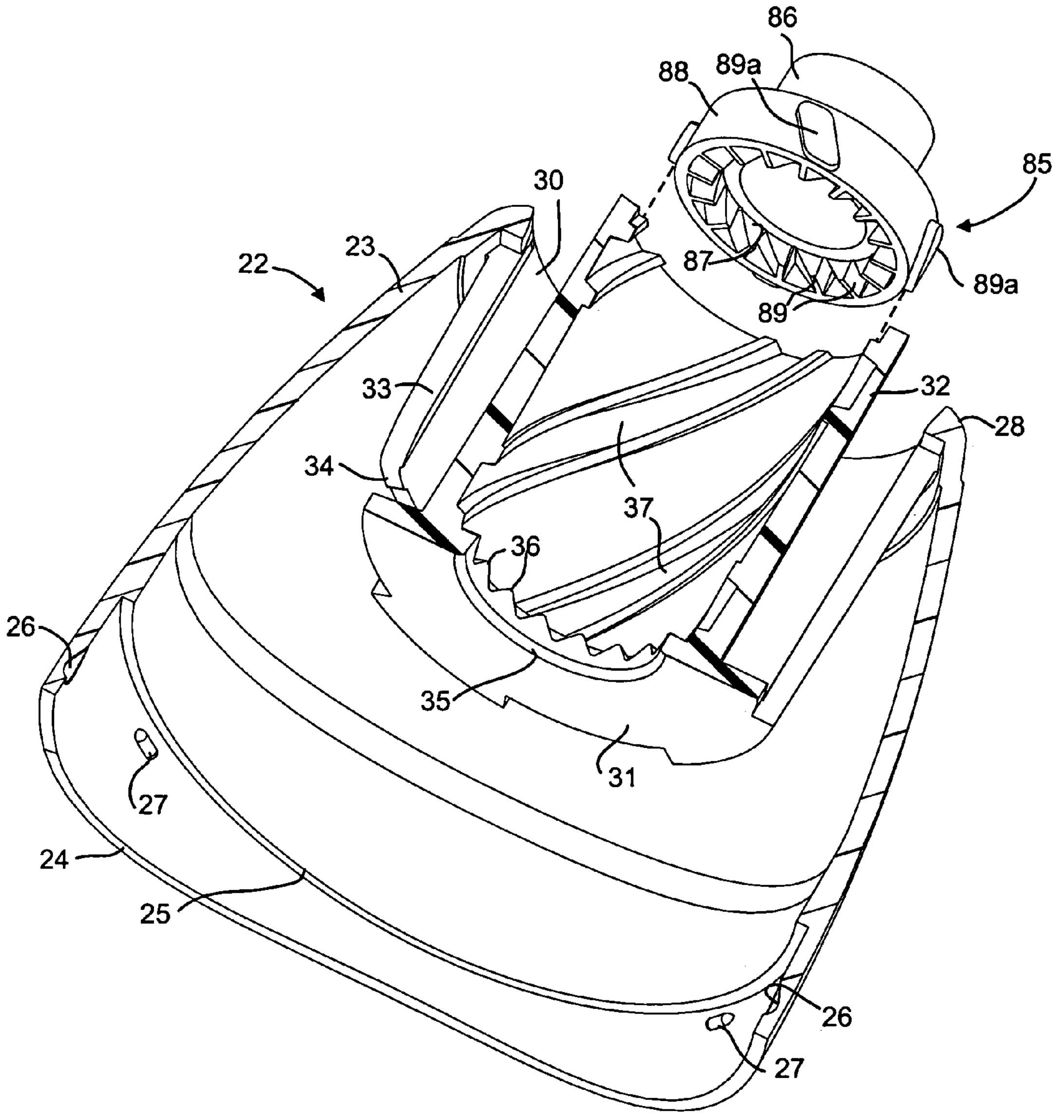
FIG. 7 is a enlarged, fragmentary, perspective view in vertical section of portions of the chopper of FIG. 1.
Figure 8:
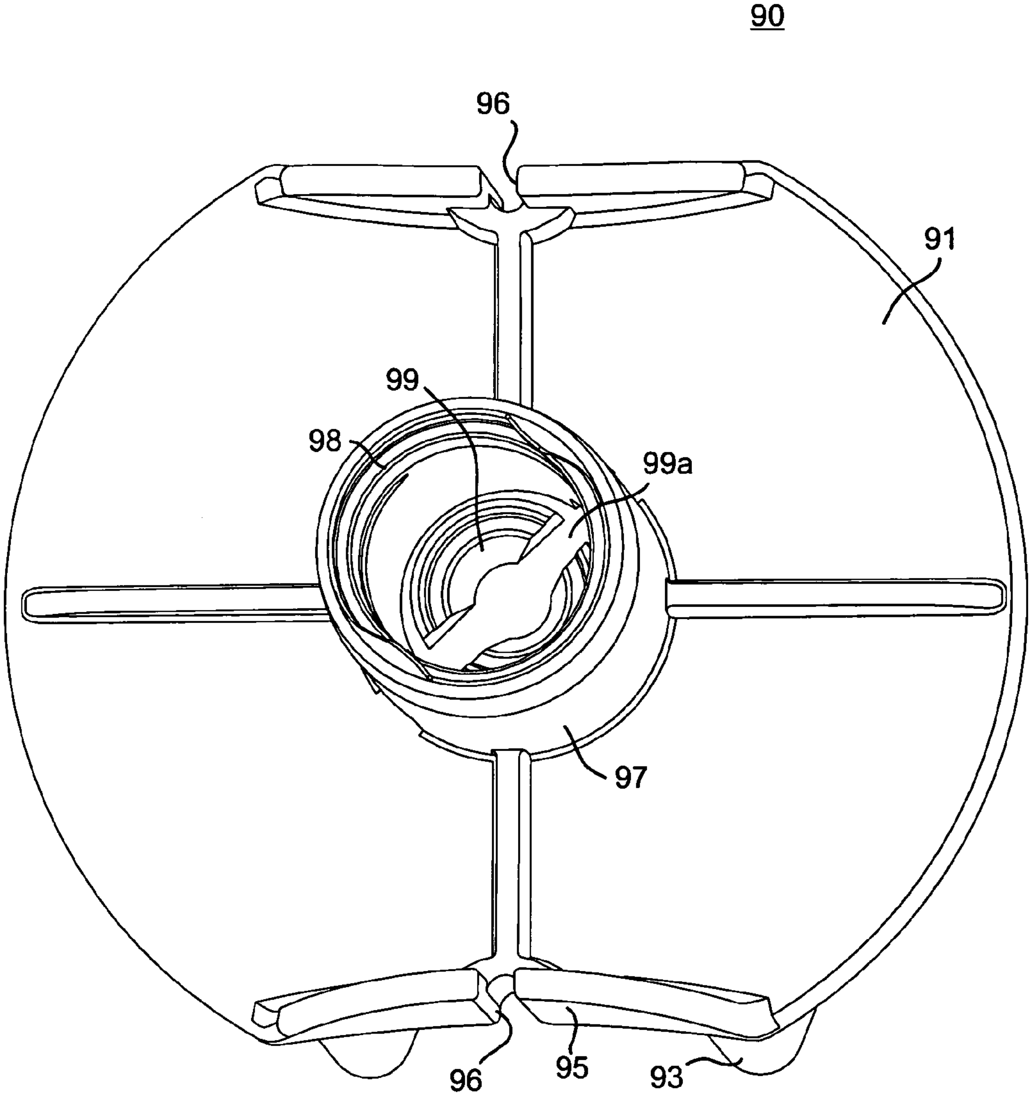
FIG. 8 is an enlarged, top perspective view of the blade assembly of the chopper of FIG. 5.
Figure 9:
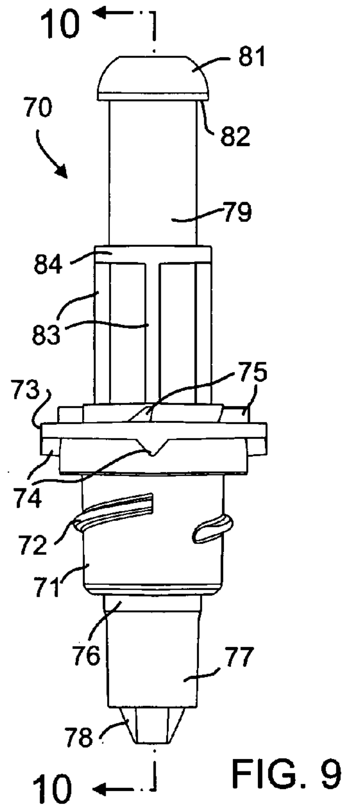
FIG. 9 is an enlarged front elevational view of the shaft of the chopper of FIG. 5.
Figure 11:
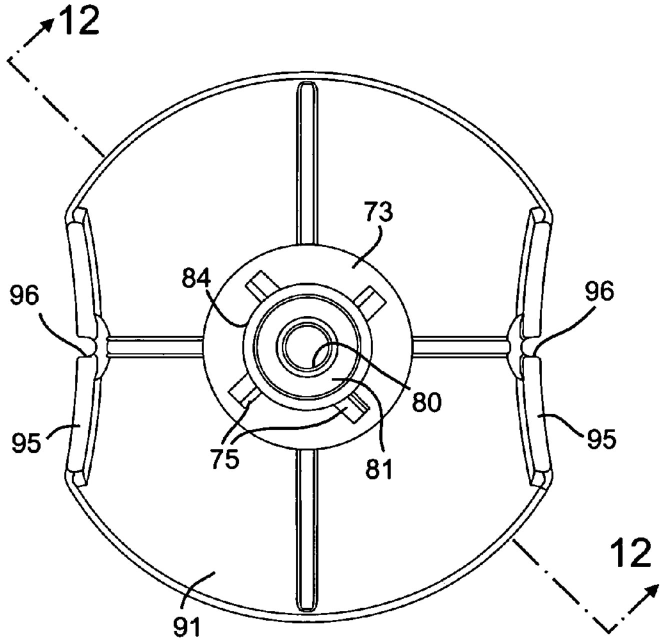
FIG. 11 is an enlarged top plan view of the assembled shaft and blade assembly of the chopper of FIG. 5.
Figure 10:
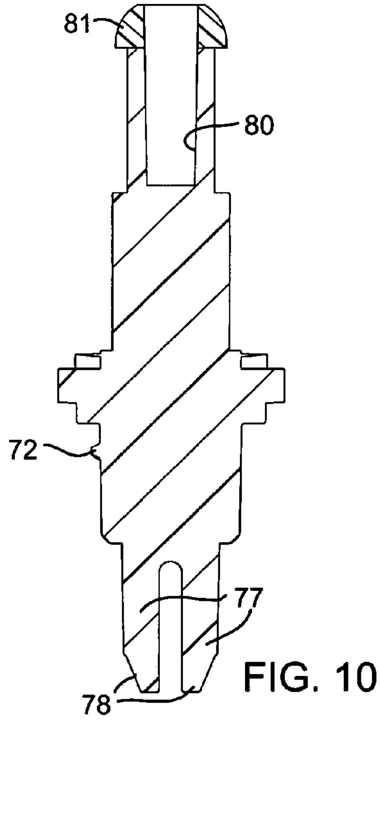
FIG. 10 is a sectional view taken along the line 10—10 in FIG. 9.
Figure 12:
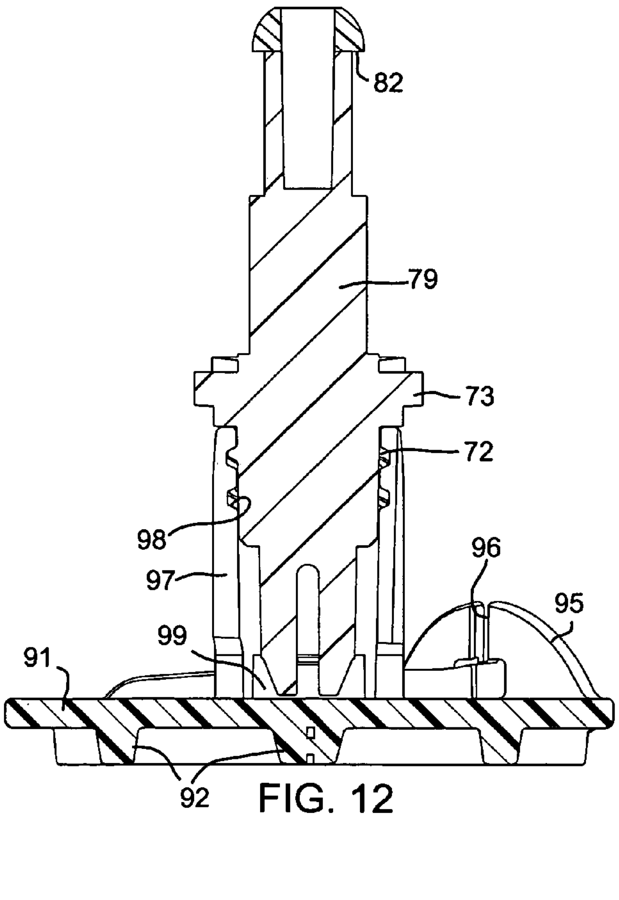
FIG. 12 is a sectional view taken along the 12—12 in FIG. 11.

Referring to FIGS. 1–5, there is illustrated a food chopper, generally designated by the numeral 20, which includes a housing 21, which may be a two-part housing, including an upper body 22 and a lower body 40, which may each be of unitary, one-piece construction and may be molded of suitable plastic materials. The upper body 22 has an upwardly and radially inwardly tapering, somewhat bullet-shaped outer wall 23 having a sinuous or undulating lower edge 24. The inner surface of the outer wall 23 is recessed just above the lower edge 24 to define an annular shoulder 25. Referring also to FIGS. 6 and 7, the recessed portion of the inner surface has a pair of diametrically opposed detent recesses 26 formed therein and has a plurality of circumferentially spaced-apart latch ribs 27 projecting laterally inwardly therefrom a slight distance below the shoulder 25. The outer wall 23 terminates at an upper edge 28.

Integral with the outer wall 23 at the upper edge 28 and depending therefrom is an outer cylindrical wall 30 (see FIGS. 4, 6 and 7) integral at its lower edge with a radially inwardly extending annular bottom wall 31 which is, in turn, integral with an upstanding inner cylindrical wall 32 which is coaxial with the outer cylindrical wall 30 and extends a slight distance upwardly above the upper edge 28. Formed in the outer cylindrical wall 30 are equiangularly spaced-apart and axially extending guide slots 33, each communicating at its lower end with a circumferentially extending latch slot 34 just above the bottom wall 31. The portion of the bottom wall 31 which extends radially inwardly beyond the inner cylindrical wall 32 defines an annular shoulder 35 having circumferentially spaced teeth 36 formed on the upper surface thereof (see FIG. 6). Formed in the inner surface of the inner cylindrical wall 32 and extending the length thereof are a plurality of equiangularly spaced-apart helical or spiral grooves 37. Formed through the outer wall 23 just below the upper edge 28 and communicating with the space between the outer wall 23 and the outer cylindrical wall 30 are two diametrically opposed pairs of apertures 38 for a purpose to be explained below. A helical compression spring 39 (see FIG. 4) is disposed in the space between the inner and outer cylindrical walls 32 and 30 and is seated on the bottom wall 31.

Figure 4:
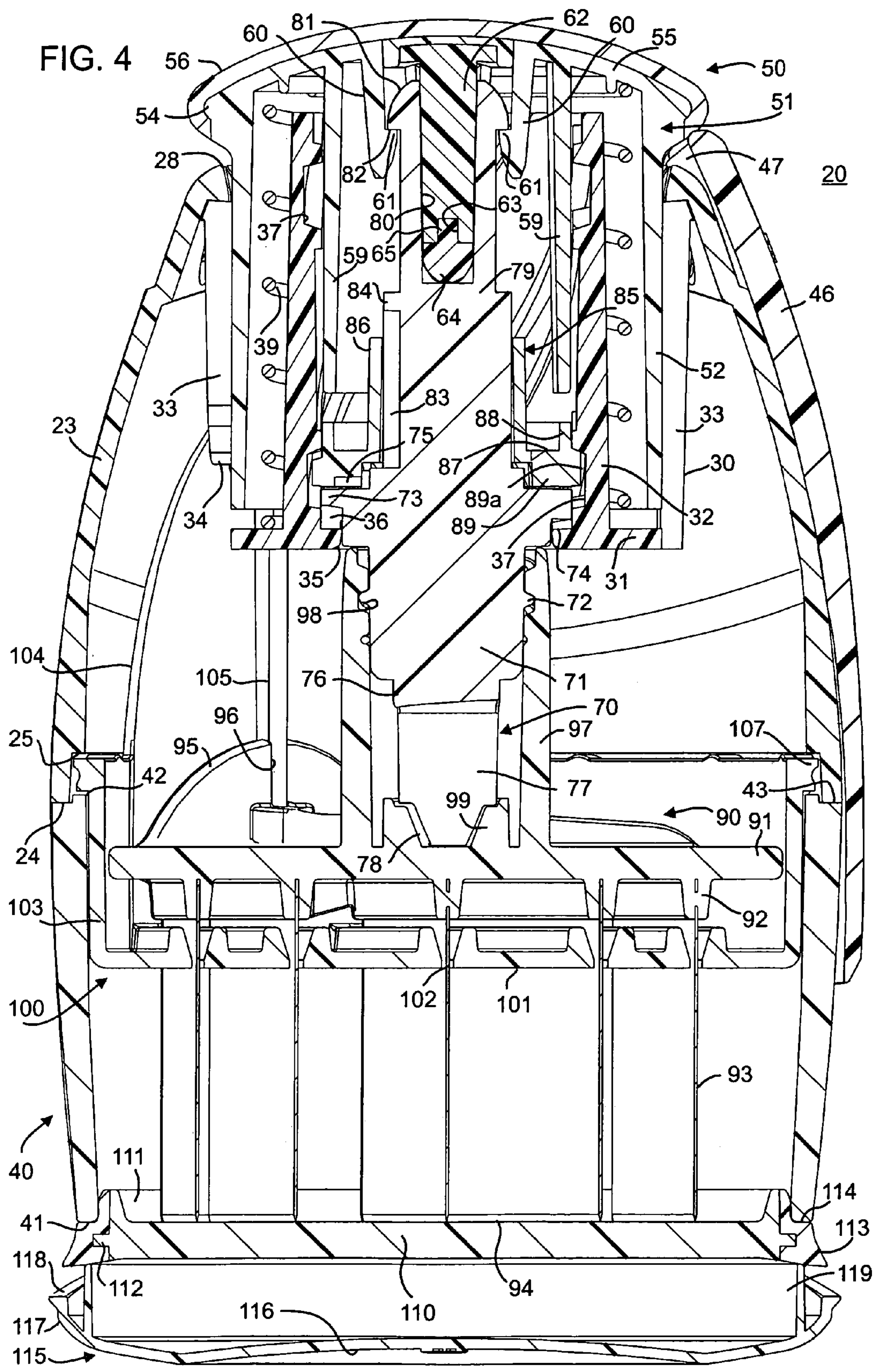
FIG. 4 is an enlarged sectional view taken along the line 4—4 in FIG. 3.
Figure 5:
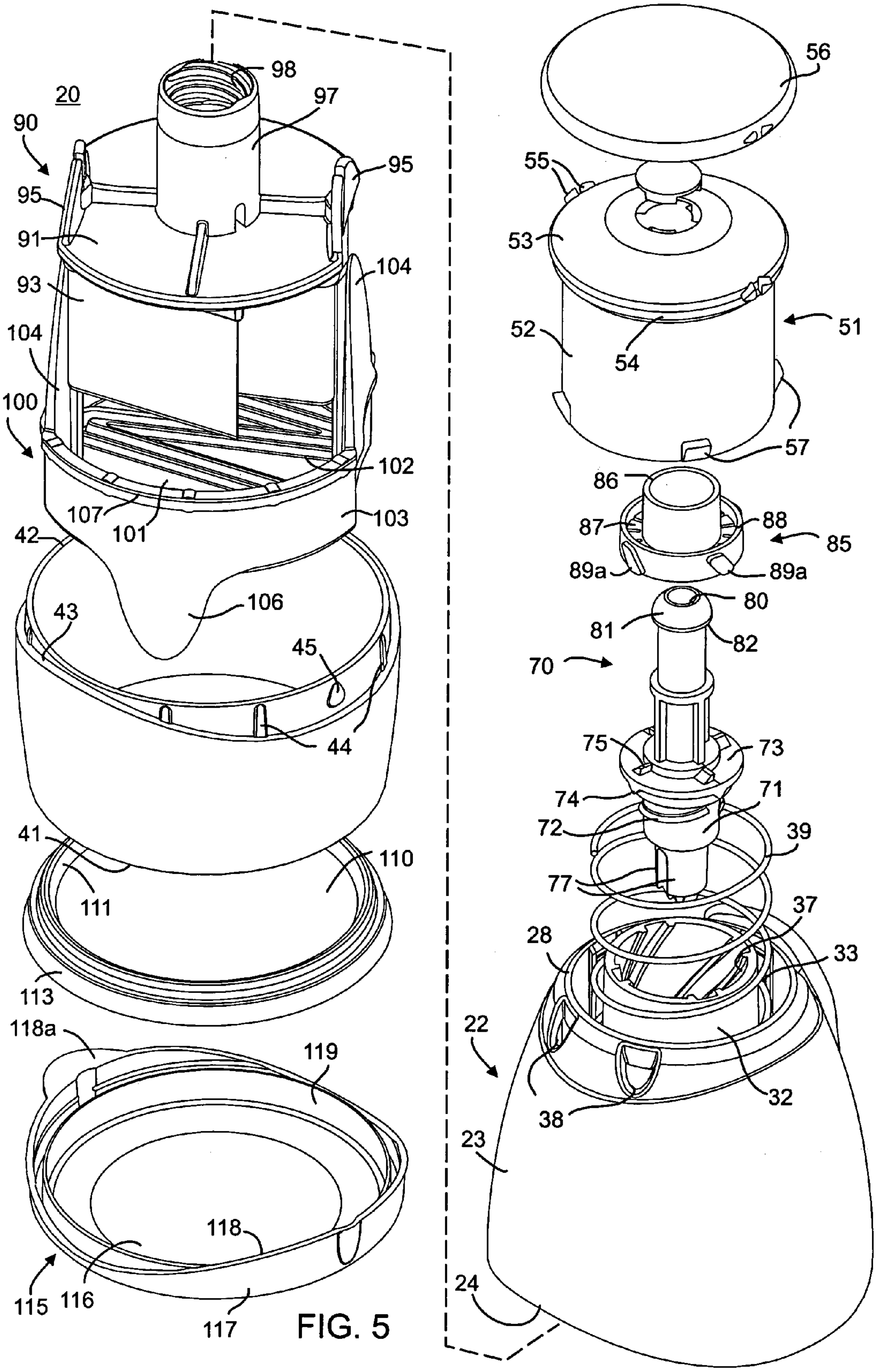
FIG. 5 is an exploded perspective view of the chopper of FIG. 1.

The lower body 40 is generally cylindrical in shape and terminates at a circular lower edge 41 and a circular upper edge 42 (see FIG. 4). The outer surface of the lower body is recessed adjacent to the upper edge 42 to define a sinuous or undulating shoulder 43. Formed on the recessed surface above the shoulder 43 are a plurality of spacing ribs 44 and two diametrically opposed detent beads 45. In use, the lower body 40 is adapted to mate with the upper body 22 so that the sinuous lower edge 24 of the upper body 22 seats against the sinuous shoulder 43 of the lower body 40, and with the detent beads 45 respectively seating in the detent recesses 26 to resiliently retain the parts in their assembled condition. For disassembly, relative rotational or twisting movement of the upper and lower bodies 22 and 40 creates a camming action along the sinuous mating surfaces to facilitate separation of the parts.

Figure 1:
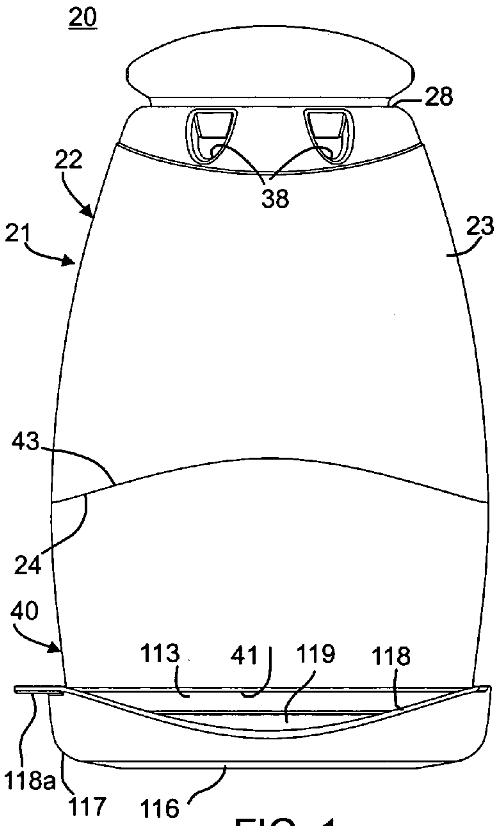
FIG. 1 is a front elevational view of a chopper.
Figure 2:
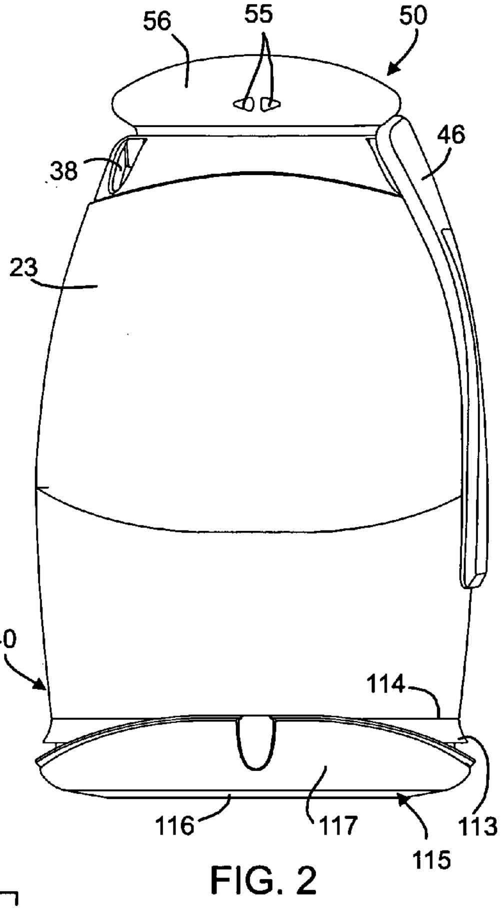
FIG. 2 is a right-hand side elevational view of the chopper of FIG. 1.
Figure 3:
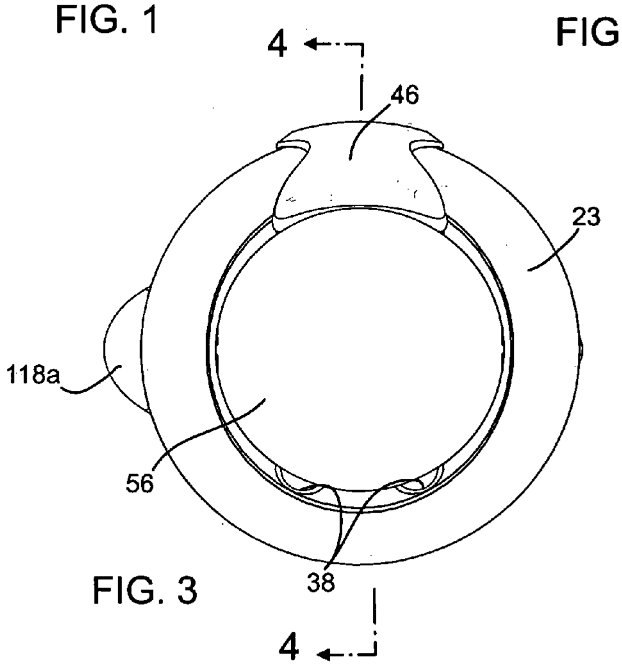
FIG. 3 is a top plan view of the chopper of FIG. 1.

As can be seen in FIGS. 2 and 3, an elongated plastic scraper 46 may be mounted on the outside of the housing 21, the scraper 46 being provided with a pair of hooks 47 (see FIG. 4) adjacent to its upper end for being received in one pair of the apertures 38, the scraper 46 being dimensioned to follow the external contours of the housing 21 so that it fits snugly against the outer surface thereof, as can best be seen in FIGS. 2 and 3. The scraper 46 is easily removable and is formed of a suitable relatively flexible plastic material and can be used to facilitate scraping food contents from the interior surfaces of the chopper 20.

Referring in particular to FIGS. 4–7. a plunger assembly 50 is mounted in the upper end of the housing 21. The plunger assembly 50 includes a plunger 51 including a cylindrical wall 52 closed at the upper end thereof by a slightly domed top wall 53, which extends laterally outwardly beyond the cylindrical wall 52 to define a peripheral lip 54 having diametrically opposed pairs of projections 55 projecting radially outwardly therefrom. The top wall 53 may be covered by a cap 56 formed of a suitable flexible and resilient frictional gripping material, such as that sold under the trade name Santoprene, the cap 56 fitting over the lip 54 and having apertures therethrough through which the projections 55 may extend so as to be visible in use. A plurality of equiangularly spaced-apart latch tabs 57 project radially outwardly from the cylindrical wall 52 adjacent to its lower edge. Depending from the inner surface of the top wall 53 are two diametrically opposed, part cylindrical guide arms 59 which lie along an imaginary cylinder coaxial with the cylindrical wall 52, but have a much shorter axial extent. Also depending from the inner surface of the top wall 53 radially inwardly of the guide arms 59 are a plurality of equiangularly spaced-apart latch arms 60, each provided at its lower end with a latch hook 61. Depending from the inner surface of the top wall 53 centrally thereof is an elongated post 62 having a short axial bore 63 formed in its lower end and having mounted thereon a bumper pad or shock-absorber 64 formed of a suitable elastomeric material and having a neck 65 which seats in the bore 64.

Referring now in particular to FIGS. 4, 5 and 9–12, the plunger assembly 50 also includes an elongated shaft 70 having a cylindrical main body 71 provided with an external thread 72. Integral with the main body 71 intermediate the ends of the shaft 70 is a radially outwardly extending annular flange 73 provided on its lower surface with a set of circumferentially spaced lower teeth 74 and on its upper surface with a plurality of circumferentially spaced upper teeth 75. The lower end of the shaft 70 defines a bifurcated post 76 forming a pair of arms 77, respectively provided at their lower ends with radially inwardly tapered projections 78. The upper end of the shaft 70 defines an upper post 79 having an axial bore 80 formed in the upper end thereof. Integral with the upper post 79 and its upper end is an radially outwardly extending latch flange 81 defining an annular lip 82. Projecting radially outwardly from the shaft 70 immediately above the flange 73 are equiangularly spaced and axially extending spacer ribs 83 joined at their upper ends by a ring 84.

Referring in particular to FIGS. 4–7, the plunger assembly 50 also includes an indexer sleeve 85 having an inner cylindrical wall 86 joined at its lower end by a radially outwardly extending annular web 87 to an outer cylindrical wall 88, which is much shorter than the inner cylindrical wall 86. Formed on the underside of the annular web 87 are plurality of circumferentially spaced teeth 89. Formed on the outer surface of the outer cylindrical wall 88 are a plurality of equiangularly spaced-apart keys 89*a* designed to respectively ride in the spiral grooves 37 of the housing 21.

In assembly, the indexer sleeve 85 is fitted down over the upper end of the shaft 70, with the teeth 89 disposed for engagement with the upper teeth 75 of the shaft 70. Then the shaft 70 is installed in the plunger 51, the latch flange 81 of the shaft 70 being snap-fitted between the latch arms 60 of the plunger 51 so that the hooks 61 latch under the lip 82 to hold the shaft 70 in place. During this assembly, the plunger post 62 is received in the bore 80 of the shaft 70 so that the bumper pad 64 engages the shaft 70 at the inner end of the bore 80, as can best be seen in FIG. 4. When thus assembled, the inner cylindrical wall 86 of the indexer sleeve 85 fits up coaxially within the guide arms 59 of the plunger 51, the indexer sleeve 85 being capable of axial movement which is limited by engagement with the lower ends of the guide arms 59 and by engagement with the flange 73 of the shaft 70.

When the plunger assembly has thus been assembled, it is then mounted in the housing 21. More specifically, the upper end of the spring 39 is received between the cylindrical wall 52 and the guide arms 59 of the plunger 51, the plunger assembly 50 being pushed down into the housing 21, compressing the spring 39, with the shaft 70 and the indexer sleeve 85 being fitted down within the inner cylindrical wall 32 of the housing 21, and the cylindrical wall 52 of the plunger 51 being fitted between the outer and inner cylindrical walls 31 and 32 of the housing 21. The latch tabs 57 snap past the upper edge 28 of the housing 21 and respectively into the longitudinal guide slots 33 for latching the plunger assembly 50 in an assembled condition on the housing 21, the spring 39 resiliently urging the plunger assembly 50 upwardly to a raised position (not shown) wherein the latch tabs 57 are stopped at the upper ends of the guide slots 33. As the plunger assembly 50 is fitted into the housing 21, the keys 89*a* of the indexer sleeve 85 respectively enter and ride in the spiral grooves 37 of the housing 21.

It will be appreciated that the plunger assembly 50 may be reciprocated up and down between the normal raised position and a lowered position, wherein the cylindrical wall 52 of the plunger 51 bottoms against the annular bottom wall 31 of the housing 21 (see FIG. 4). The plunger assembly 50 may be latched in this lowered position by rotating the plunger 51 about ⅛ of a turn to move the latch tabs 57 into the latch slots 34 of the housing 21, in a known manner.

Referring now in particular to FIGS. 4, 5, 8, 11 and 12, the chopper 20 includes a blade assembly 90 having a flat, generally circular base plate 91 having formed on its underside a depending elongated linear boss in a serpentine shape, which receives and has embedded therein the upper edge of a serpentine blade 93 having a cutting edge 94 at its lower end. Upstanding from the base plate 91 at diametrically opposed locations, along parallel chords, are guide flanges 95, each having an axial slot or groove 96 formed therein. The serpentine blade 93 is symmetrical about an axis passing through the grooves 96. The blade assembly 90 includes a hollow cylindrical neck 97 projecting axially upwardly from the base plate 91 centrally thereof and provided at its upper end with internal threads 98. Formed in the lower end of the neck 97 is a conically tapered seat 99, having a diametrical slot 99*a* formed thereacross (see FIG. 8).

In assembly, the lower end of the shaft 70 is received in the cylindrical neck 97 of the blade assembly 90, the threads 72 on the shaft 70 threadedly engaging the internal threads 98 in the neck 97. When the parts approach full threaded engagement, which may be after about ½ turn, the tapered projections 78 on the shaft arms 77 enter the tapered seat 99 in the neck 97, compressing the arms 77 together until the projections 78 snap into the slot 99*a*. This resiliently holds the parts together and inhibits inadvertent unscrewing thereof. This threaded connection permits the blade assembly 90 to be easily removed for cleaning by simply rotating it about ½ turn.

The chopper 20 also includes a stripper 100 including a generally circular base plate 101 having a serpentine slot 102 formed therein for receiving the serpentine blade 93. Integral with the base plate 101 at its outer edge and upstanding therefrom is a generally cylindrical side wall 103 which is, in turn, integral with a pair of upstanding, diametrically opposed, generally oval-shaped guide arms 104, respectively provided with laterally inwardly extending guide ribs 105 extending longitudinally along the entire axial extent of the guide arms 104. Depending from the base plate 101 at its outer edge is a scraper arm 106 (see FIG. 5). The upper edge of the side wall 103 is provided with a radially outwardly projecting latch flange 107.

In assembly, the guide arms 104 of the stripper 100 are fitted up inside the lower body 40 of the housing 21. To facilitate this insertion in the correct orientation, the guide arms 104 are aligned with the guide flanges 95 of the blade assembly 90 so that the guide ribs 105 are respectively received in the grooves 96. This will orient the parts so that the serpentine blade 93 will be aligned with and fit cleanly through the serpentine slot 102 of the stripper 100. Insertion continues until the latch flange 107 snaps into engagement above the upper edge 42 of the housing lower body 40 (see FIG. 4) for resiliently holding the stripper 100 in place. Because of the symmetry of the blade 93, the stripper can be inserted in either of the two orientations 180° apart.

Referring in particular to FIGS. 1–5, the chopper 20 also includes a circular base plate 110 having an upstanding cylindrical side wall 111 at its periphery. Projecting radially outwardly from the base plate 110 is a circumferential rib 112. An elastomeric seal ring 113 is fitted over the outer edge of the base plate 110, having a pocket which receives the rib 112. The seal ring 113 completely covers the outer peripheral surface of the base plate 110 and is stepped to define an annular shoulder 114. In use, the base plate 110 and the seal member 113 are so dimensioned that the cylindrical wall 111 and its seal member covering may be fitted snugly up inside the lower end of the lower body 40, so that the lower edge 41 of the housing lower body seats on the annular shoulder 114, as can best be seen in FIG. 4. Thus, in use, food items may be disposed in the housing 21, which may then be closed by the base plate 110 so that the food items rest on the base plate 110 as they are being chopped by the reciprocating movement if the blade assembly 90, all in a known manner. Alternatively, the lower edge 41 of the housing could be seated on any suitable underlying support surface, such as a countertop, chopping block or the like, for confining the food items being chopped. However, the base plate 110 has the advantage of providing a ready-made container so that, after chopping is complete, the lower body 40 need simply be detached from the upper body 22 and the chopped food is then contained within the lower body 40.

The chopper 20 is also provided with a cap 115 which is formed of a flexible and resilient material and is dimensioned so that, when not in use, it can be fitted over the base plate 110, as illustrated in FIGS. 1–4. The cap 115 has a circular end wall 116 and is provided at its periphery with an upstanding outer cylindrical wall 117 having a sinuous or undulating upper edge 118. A handle tab 118*a* projects radially outwardly from the upper end of the cylindrical wall 117. There is also provided an inner cylindrical wall 119 which is upstanding from the end wall 116 a slight distance radially inwardly from the outer cylindrical wall 117 and coaxial therewith.

When the cap 115 is not in use, the raised portions of the outer cylindrical wall 117 fits snugly around the seal ring 113 of the base plate 110 so that it does not become misplaced. After food is chopped upon the base plate 110, the lower body 40 may be detached, as explained above, and the cap may be fitted on the upper end thereof for closing the container of chopped food items. In this regard, the inner cylindrical wall 119 of the cap fits down inside the upper edge 42 of the lower body 40, while the outer cylindrical wall 117 fits along the recessed outer surface of the lower body 40 so that the sinuous edge 118 mateably engages the sinuous shoulder 43 on the lower body 40. Detent recesses (not shown) may be provided on the inner surface of the outer cylindrical wall 117 for respectively receiving the detent beads 45 on the lower body 40 to assist in retaining the cap 115 in place.

It will be appreciated that, in use, the plunger assembly 50 is reciprocated up and down, carrying with it the blade assembly 90 for chopping food items disposed in the lower body 40, all in a known manner. As the shaft 70 moves downwardly to its lowermost position, wherein the serpentine blade 93 bottoms on the base plate 110, as seen in FIG. 4, the shaft flange 73 separates from the indexer sleeve 85, which is retarded by the spiral grooves 37 and stopped at the lower ends of those grooves. Upon the return stroke of the plunger assembly 50, the upper teeth 75 on the shaft flange 73 reengage the teeth 89 on the indexer sleeve 85 and carry the indexer sleeve 85 back upwardly with the plunger assembly 50. However, since the indexer sleeve 85 is keyed in the spiral grooves 37 it rotates as it rises, causing the shaft 70 and blade assembly 90 to also rotate, approximately ⅛ turn. Thus, for each down/up plunger cycle the blade assembly 90 rotates slightly to effect an even chopping action on the food item, all in a known manner. As the blade assembly 90 reciprocates up and down, the stripper 100 serves to wipe food items from the blade 93, again in a known manner. It is significant that the elastomeric bumper 64 between the post 62 and the shaft 70 serves to absorb shock and vibration during the reciprocating chopping action, thereby minimizing user stress and minimizing the chance of cracking or otherwise damaging the chopper 20.

From the foregoing, it can be seen that there has been provided an improved chopper which is of relatively simple and economical construction, permitting easy disassembly of all of the parts which come in contact with the food items during use, to facilitate cleaning and easy reassembly by a user. In a constructional model of the chopper 20, the spring 39 and the blade 93 may be formed of suitable metals, such as suitable steels, while all of the rest of the parts may be formed of suitable plastic materials. If desired, the lower body 40 of the housing 21 may be formed of a light-transmitting plastic material, such as a transparent plastic, to facilitate viewing the food items being chopped and to permit ready identification of items which are stored in the lower body 40.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A food chopper comprising:

a housing for receiving a food item, a blade assembly including a blade and moveable within the housing for chopping the food item, a shaft attached to the blade assembly for movement therewith, a plunger assembly coupled to the shaft for effecting reciprocating and rotational movement thereof, and a shock absorber disposed between the plunger assembly and the shaft, wherein the shaft has an axial bore formed in an end thereof, the plunger has a post coaxially received in the bore, and the shock absorber is disposed between the post and an inner end of the bore.

2. The chopper of claim 1, wherein the shock absorber comprises an elastomeric body.

3. The chopper of claim 1, wherein the post has a recess in an inner end thereof, the shock absorber having a portion receivable in the recess.

4. The chopper of claim 1, wherein there is a threaded connection between the shaft and the blade assembly.

5. A food chopper comprising:

a housing for receiving a food item, a blade assembly including a blade and moveable within the housing for chopping the food item, a shaft attached to the blade assembly for movement therewith, a plunger assembly coupled to the shaft for effecting reciprocating and rotational movement thereof, a shock absorber disposed between the plunger assembly and the shaft, and structure for latching the plunger assembly to the shaft, the structure including snap-fittable interlocking flanges respectively formed on the plunger assembly and the shaft.

6. A food chopper comprising:

a housing for receiving a food item, a blade assembly including a blade, the blade assembly reciprocable and rotatable within the housing for chopping the food item, a shaft threadedly connected to the blade assembly for movement therewith, a plunger assembly coupled to the shaft for effecting reciprocating and rotational movement thereof, and cooperating structure on the shaft and on the blade assembly for indicating when the shaft has been threadedly engaged with the blade assembly in a mounted condition, the cooperating structure including a bifurcated end on the shaft, and including a recess on the blade assembly for receiving the bifurcated end.

7. The chopper of claim 6, wherein the blade assembly includes a cylindrical neck which is threadedly connected to the shaft.

8. the chopper of claim 7, wherein the neck is a hollow tubular construction which is internally threaded for threadedly receiving the shaft therein.

* * * * *